United States Patent [19]
Lee

[11] Patent Number: 4,905,216
[45] Date of Patent: Feb. 27, 1990

[54] METHOD FOR CONSTRUCTING AN OPTICAL HEAD BY VARYING A HOLOGRAM PATTERN

[75] Inventor: Wai-Hon Lee, Cupertino, Calif.
[73] Assignee: Pencom International Corporation, Sunnyvale, Calif.
[21] Appl. No.: 141,460
[22] Filed: Jan. 20, 1988

Related U.S. Application Data

[63] Continuation-in-part of Ser. No. 938,085, Dec. 4, 1986, Pat. No. 4,794,585, which is a continuation-in-part of Ser. No. 860,154, May 6, 1986, Pat. No. 4,731,772.
[51] Int. Cl.[4] .............................................. G11B 7/00
[52] U.S. Cl. ............................... 369/112; 350/320
[58] Field of Search ................ 369/49, 45, 46, 109, 369/110, 112, 122; 350/320; 250/201

[56] References Cited

U.S. PATENT DOCUMENTS

| | | |
|---|---|---|
| Re. 31,255 | 5/1983 | Geddes . |
| 3,628,849 | 6/1969 | Flamand et al. . |
| 4,011,400 | 3/1977 | Simons et al. . |
| 4,124,860 | 11/1978 | Johnson . |
| 4,143,402 | 3/1979 | Bricot et al. . |
| 4,216,357 | 8/1980 | Iwasaki et al. . |
| 4,241,999 | 12/1980 | Pouey . |
| 4,253,723 | 3/1981 | Kojima et al. . |
| 4,307,297 | 12/1981 | Groff et al. . |
| 4,309,605 | 1/1982 | Okabe . |
| 4,334,300 | 6/1982 | Arquie et al. . |
| 4,351,051 | 9/1982 | van Alem et al. . |
| 4,354,115 | 10/1982 | Warabisako et al. . |
| 4,355,858 | 10/1982 | Funato et al. . |
| 4,397,527 | 8/1983 | Geyer ................................. 369/112 |
| 4,409,631 | 10/1983 | Matsumoto . |
| 4,458,980 | 7/1984 | Ohki et al. ........................ 369/112 |
| 4,462,095 | 7/1984 | Chen . |
| 4,504,939 | 3/1985 | Eberly . |
| 4,525,625 | 6/1985 | Abe . |
| 4,544,843 | 10/1985 | Kern et al. . |
| 4,558,440 | 12/1985 | Tomita . |
| 4,560,249 | 12/1985 | Nishikawa et al. . |
| 4,599,714 | 7/1986 | Endo . |
| 4,607,368 | 8/1986 | Hori . |
| 4,607,914 | 8/1986 | Fienup ................................ 350/320 |
| 4,624,526 | 11/1986 | Tsukai et al. . |
| 4,626,679 | 12/1986 | Kuwayama et al. . |
| 4,670,869 | 6/1987 | Chen . |
| 4,672,593 | 6/1987 | Ojima et al. . |
| 4,689,481 | 8/1987 | Ono . |
| 4,695,992 | 9/1987 | Aoi . |
| 4,700,335 | 10/1987 | Aoi ...................................... 369/46 |
| 4,721,368 | 1/1988 | Deguchi et al. . |
| 4,731,772 | 3/1988 | Lee . |
| 4,733,065 | 3/1988 | Hoshi et al. ........................ 369/46 |
| 4,733,067 | 3/1988 | Oinoue et al. . |
| 4,736,231 | 4/1988 | Ayabe et al. . |
| 4,764,931 | 8/1988 | Matsuda . |
| 4,771,411 | 9/1988 | Greve .................................. 369/45 |
| 4,772,784 | 9/1988 | Yoshitoshi et al. . |
| 4,785,438 | 11/1988 | Mizunoe . |
| 4,787,076 | 11/1988 | Deguchi et al. . |
| 4,789,977 | 12/1988 | Oudenhuysen et al. ......... 369/109 |
| 4,807,212 | 2/1989 | Kaneda et al. .................... 369/112 |

FOREIGN PATENT DOCUMENTS

| | | |
|---|---|---|
| 207789 | 3/1984 | Fed. Rep. of Germany . |
| 56-47933 | 4/1981 | Japan . |
| 58-199573(A) | 11/1983 | Japan . |

OTHER PUBLICATIONS

G. L. Rogers, "Artificial Holograms and Astigmatism", Proceedings of the Royal Society of Edinburgh, vol. LXIII–Part IV (No. 22), 1952.
Yu S. Mosyakin & G. V. Skrotskii, "Use of Holograms as Optical Elements" (Review), Soviet Journal of Quantum Electronics, vol. 2, No. 3, pp. 199–206, 1972.
Wai-Hon Lee, "Binary Synthetic Holograms", Appl. Opt., vol. 13, pp. 1677–1682, 1972.
O. Bryngdah, "Computer-Generated Holograms as Generalized Optical Components, Optical Engineering", vol. 14, No. 5, pp. 426–435, 1975.

Primary Examiner—Donald McElheny, Jr.
Attorney, Agent, or Firm—Townsend and Townsend

[57] ABSTRACT

A method for constructing an optical head having a holographic diffraction grating for focusing a light beam on a photodetector is disclosed. The photodetector is first mounted in the optical head and the distance between the position where the hologram lens will be placed and the photodetector is measured. The holographic grating pattern which is etched onto the hologram leans is then created so that it will focus the laser beam at the measured distance. The hologram lens is then mounted in the optical head.

10 Claims, 4 Drawing Sheets

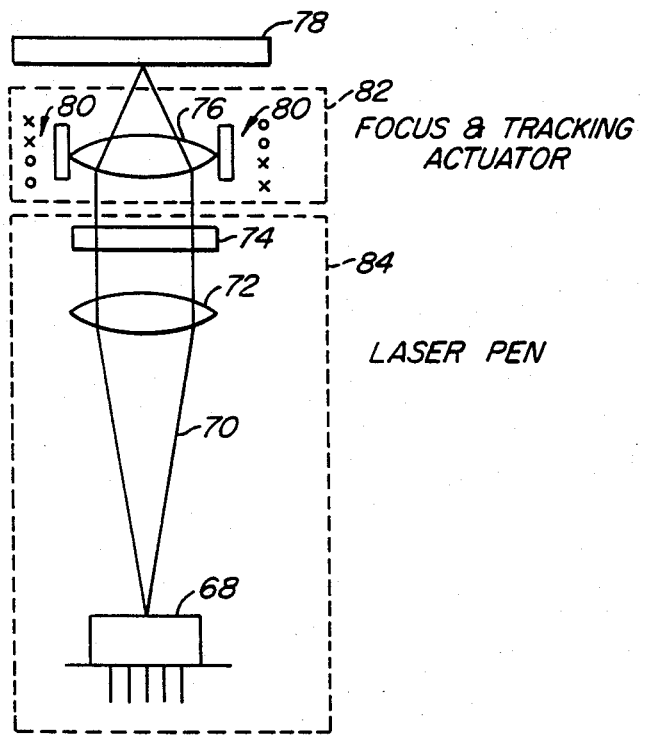
FIG._1.
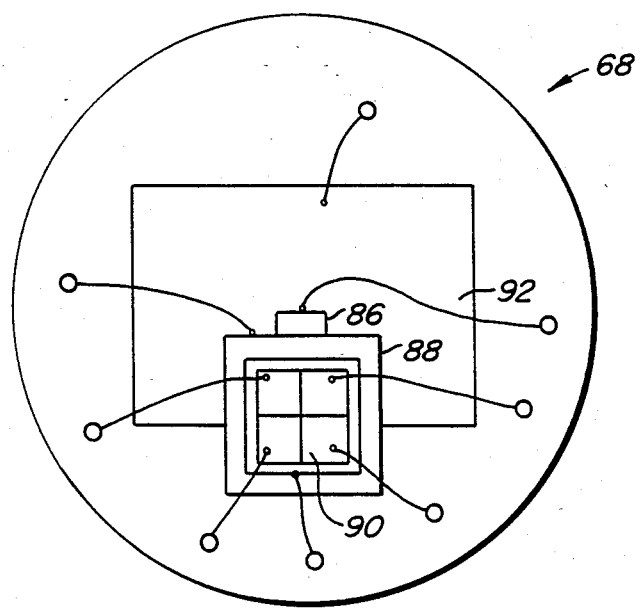
FIG._2.

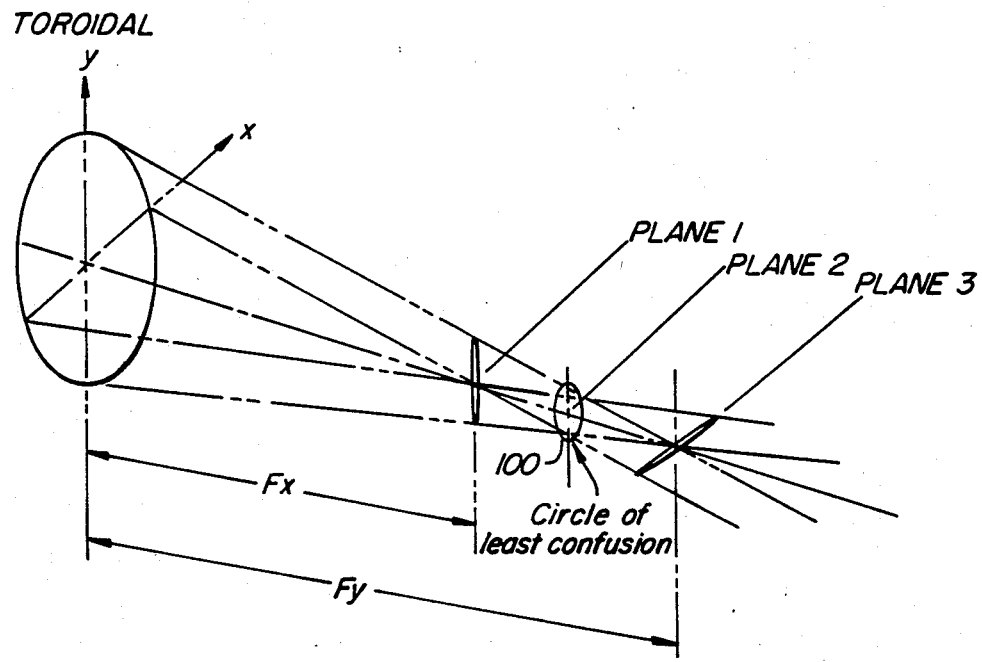
FIG._3.
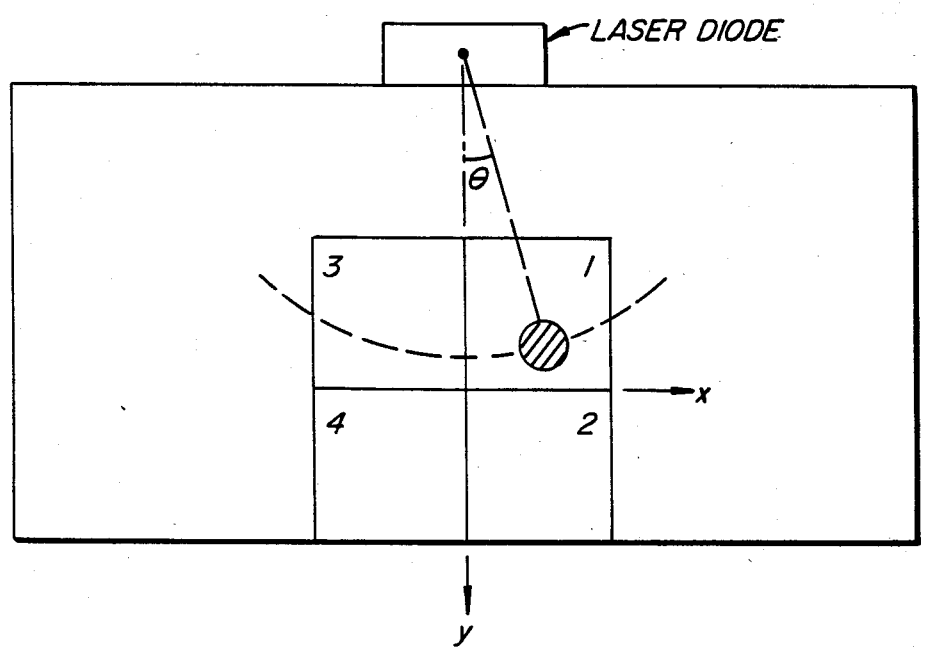
FIG._5.

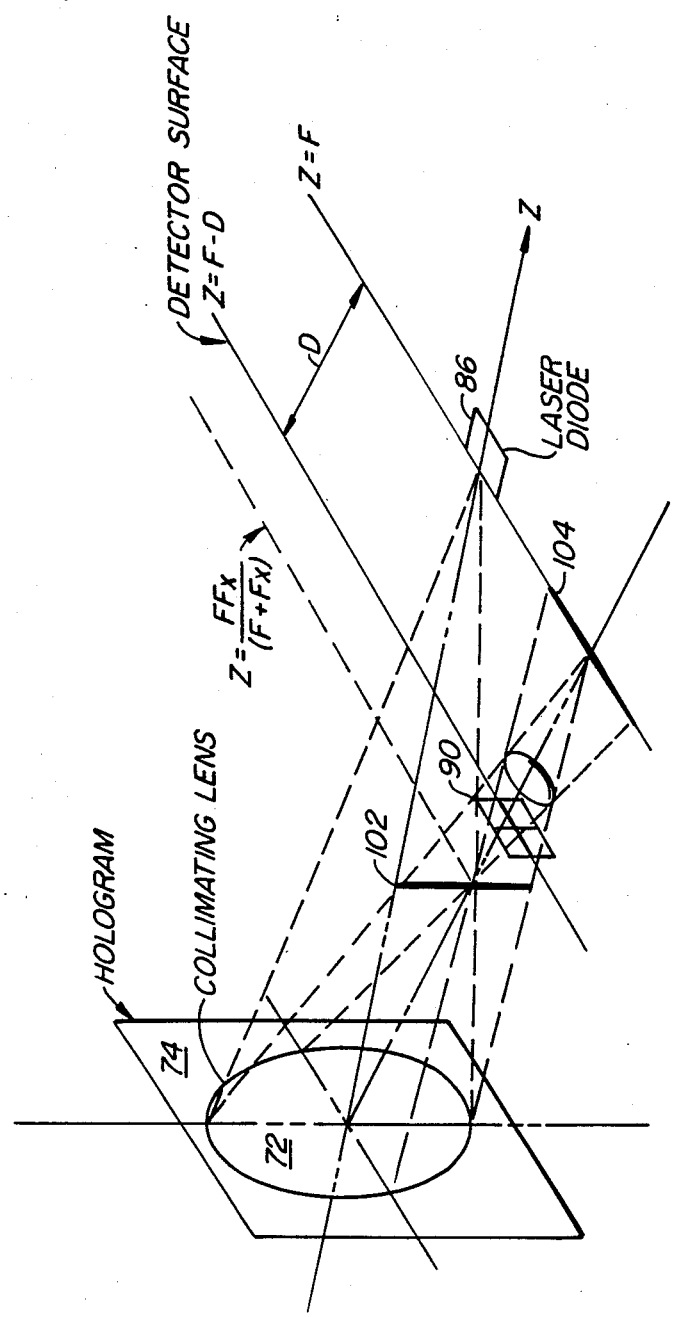
FIG._4.

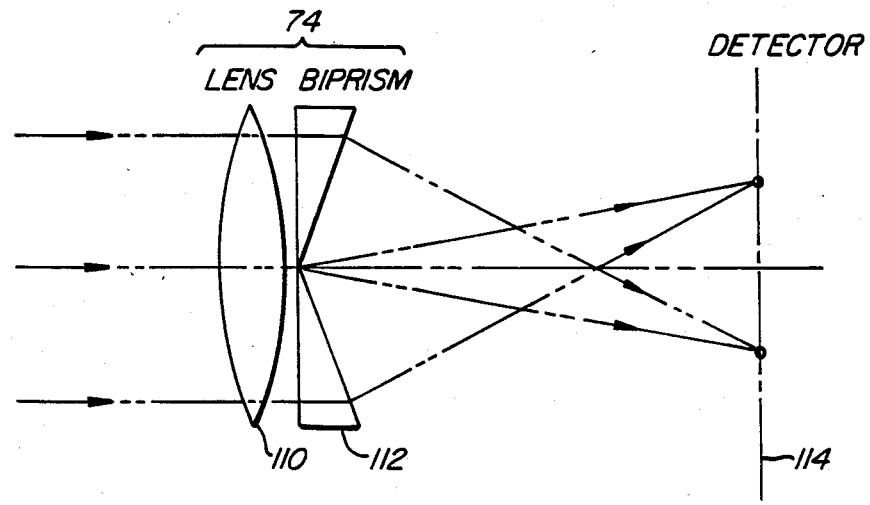
FIG._6.
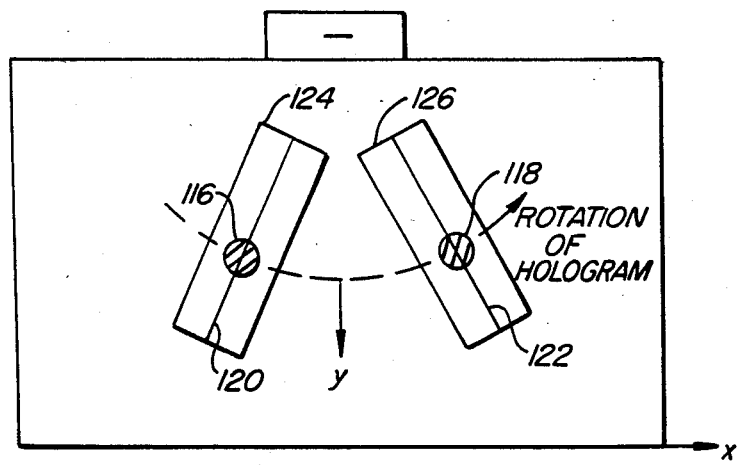
FIG._7.

METHOD FOR CONSTRUCTING AN OPTICAL HEAD BY VARYING A HOLOGRAM PATTERN

This is a continuation-in-part of application Ser. No. 938,085 filed Dec. 4, 1986, now U.S. Pat. No. 4,794,585, which is a continuation-in-part of application Ser. No. 860,154 filed May 6, 1986, now U.S. Pat. No. 4,731,772.

BACKGROUND

The present invention relates to methods for constructing optical heads and the optical heads produced thereby, and in particular to methods for aligning a lens with respect to a photodetector.

In an optical head, a laser beam from a laser diode is reflected off of a recording medium and directed back to a photodetector via a beam-splitter or a hologram lens. A hologram lens is a diffraction grating which is produced using holographic methods. When the optical head is constructed, care must be taken to mount the photodetector at a position corresponding to the focus point of the laser beam from the beam-splitter or hologram lens. Any misalignment can result in errors.

SUMMARY OF THE INVENTION

The present invention is a method for constructing an optical head having a holographic diffraction grating for focusing a light beam on a photodetector. The photodetector is first mounted in the optical head and the distance between the position where the hologram lens will be placed and the photodetector is measured. The holographic grating pattern which is etched onto the hologram lens is then created so that it will focus the laser beam at the measured distance. The hologram lens is then mounted in the optical head.

Thus, the present invention provides for the customizing of a hologram lens for a particular optical head in order to compensate for variations in the placement of the photodetector in the optical head in the z direction due to manufacturing variances. This greatly improves the accuracy of the focusing.

In a preferred embodiment, the hologram lens is formed to simulate a toroidal lens with two surface curvatures. The focus points of the different curvatures are then adjusted to be on opposite sides of the desired focus distance and at equal distances from the desired focus distance, or circle of least confusion.

This adjustment is necessary because the elevation of the photodetector relative to the laser may vary depending on the particular thickness of the substrate material of the photodetector. A higher elevation of the detector requires a stronger curvature on the toroidal lens.

In another aspect of the present invention, the toroidal wavefront produced by the hologram lens can be used to produce a linear translation of the light spot in the focus plane. This is done by translating the hologram lens laterally with respect to the optical axis of the collimating lens. Adjustment of the light spot on the focus plane can be accomplished by translating and rotating the hologram lens. This adjustment, in addition to selecting the proper curvature of the toroidal wavefront of the hologram, provides all the positional adjustment required by the optical head.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram of an optical head constructed using the method of the present invention;

FIG. 2 is a diagram of the laser diode and photodetector of optical head of FIG. 1;

FIG. 3 is a diagram showing the focus planes of a toroidal lens;

FIG. 4 is a diagram showing the focus planes of a hologram lens constructed according to the present invention;

FIG. 5 is a diagram showing the tilting of a focused beam of light across a photodetector according to the present invention;

FIG. 6 is a diagram of a second embodiment of an optical head constructed using the method of the present invention; and FIG. 7 is a diagram showing the tilting of a pair of focused light beams across a pair of photodetectors for the embodiment of FIG. 6.

DETAILED DESCRIPTION OF THE PREFERRED EMBODIMENTS

An optical head constructed according to the present invention is shown in FIG. 1. The optical head is described in detail in the parent application entitled "Improved Optical Head," Ser. No. 938,085, filed Dec. 4, 1986, U.S. Pat. No. 4,794,585 and incorporated herein by reference. The optical head is briefly described in the following paragraphs. This optical head arrangement can be used for different recording mediums, such as a thermal-magnetic medium or a medium using lands and pits. A semiconductor laser and detector 68 radiates a laser beam 70 to a collimating lens 72. The collimated beam passes through a hologram lens 74 to an objective lens 76. Hologram lens 74 can also be put between semiconductor laser and detector 68 and the collimating lens 72. Objective lens 76 focuses the beam onto a medium 78. Objective lens 76 can be moved by a coil 80 in a focusing and tracking actuator 82. Semiconductor laser and detector 68, collimating lens 72 and hologram lens 74 form a laser pen 84 portion of the optical head.

FIG. 2 shows a front view of the semiconductor laser and photodetector 68. A semiconductor laser 86 is mounted on a heat sink 88. A four-quadrant photodetector 90 is mounted on the face of heat sink 88. A photodetector 92 is located behind semiconductor laser 86 to measure the light emitted from the semiconductor laser. Photodetector 92 is at an angle so that it does not reflect light back into semiconductor laser 86. A more detailed description of a preferred embodiment of semiconductor laser and photodetector 68 is presented in copending application Ser. No. 858,411, filed May 1, 1986, U.S. Pat. No. 4,757,197.

In operation, laser beam 70 from semiconductor laser 86 is collimated or made parallel by collimating lens 72. This collimated beam passes through hologram lens 74 to produce a zero order diffracted beam and a number of higher order diffracted beams. The zero order diffracted beam is the one which continues on the same path, and not at an angle, and is the only beam used in the forward light path of the optical head. This beam is focused on medium 78 by objective lens 76 which can be moved with coil 80.

On the return path, the beam again hits hologram lens 74 producing zero and higher order diffracted beams. The zero order beam is returned to the laser and is not used for detection. The reflected beam on the return path also produces higher order diffracted beams from holographic lens 74. One of these higher order diffracted beams is imaged onto photodetector 90.

In one embodiment the hologram lens 74 is similar to a toroidal lens which is a spherical lens with two surface curvatures. This type of lens can produce two astigmatic foci as shown in FIG. 3. The wavefront description of the toroidal lens is given by $$\phi(x,y) = \pi/\lambda(x^2/F_x + y^2/F_y), \quad (1)$$

where $F_x$ is the distance where the beam is focused on lane 1 and $F_y$ is the distance where the beam is focused on plane 3. The circular spot 100 on plane 2 is called the circle of least confusion which is in effect the focal point of the toroidal lens.

Using the wavefront description in Eq.1 we can produce a holographic optical element which can have the same characteristics in one of its first diffracted orders. The use of a holographic toroidal lens permits our optical head to project the spot corresponding to the circle of least confusion to any plane along its optical axis. This point can be illustrated by the following example.

In FIG. 4 we show a collimating lens 72 with focal length F and a laser diode 86 located at the focal plane P of lens 72. In the same figure we show that the surface of the detector 90 is at a distance D from the laser diode. A holographic optical element 74 is placed near collimating lens 72. Suppose the wavefront produced by holographic lens element 74 has only one curvature and is represented by $$\phi(x) = \pi/\lambda x^2/F_x, \quad (2)$$

The locations of the two astigmatic foci as shown in FIG. 4 are at F and F $F_x/(F+F_x)$. The distance of one foci 102 from the detector 90 is equal to D and the distance of the second foci 104 from the detector surface 90 is F $-$ [F $F_x/$(F $F_x$)] $-$ D. As can be seen, it is not possible to have the two astigmatic foci at the same distance from the detector surface 90 unless the separation of the two foci is equal to 2D. In practice the distance D is about 0.5 mm and the desirable separation S between the two foci is about 0.2 mm.

With a toroidal wavefront given in Eq. (1) it is possible to find values $F_x$ and $F_y$ such that the two foci can be separated by any distance S and be at equal distances from the detector surface 90. The relationship for determining $F_x$ and $F_y$ are as follows:

$$1/F + 1/F_x = 1/(F-D+S/2), \quad (3)$$

$$1/F + 1/F_y = 1/(F-D-S/2). \quad (4)$$

Since the parameters F, D and S are known, $F_x$ and $F_y$ can be found using Eq. (3) and Eq. (4) and substituting them into Eq. (1) for the construction of the toroidal holographic optical element 74. D and F are found by mounting laser diode 86 and photodetector 90 in the optical head and measuring the distances. Once the foci are known, the line pattern for the hologram lens can be produced by standard techniques. See, for instance, Wai-Hon Lee, *Binary Synthetic Holograms*, Applied Optics Vol. 13, No. 7, p.1677 (July, 1974).

There is another feature of the toroidal wavefront which is very important to the construction of the optical head. Note that the spatial variation of the wavefront $\phi(x,y)$ along x and along y are quadratic in nature. When a small translation of the hologram is made along either direction of the optical axis the resulting wavefront becomes $$\phi(x-a, y-b) = \frac{\pi}{\lambda}((x-a)^2/F_x + (y-b)^2/F_y), =$$

$$\frac{\pi}{\lambda}(x^2/F_x + y^2/F_y) + \frac{\pi}{\lambda}(a^2/F_x + b^2/F_y), -$$

$$2\frac{\pi}{\lambda}(ax/F_x + by/F_y)$$

The last two terms are linear in x and y. As is well known, a wavefront with a linear variation can cause a tilt in the propagation of the wavefront. The tilt in the propagation allows the adjusting the position of the spot or circle of least confusion with respect to the quadrant detector as shown in FIG. 5. Thus, the holographic lens can be shifted with respect to the optical axis of the optical head to produce the desired tilting and the shifting of the light spot on the focus plane. Of course, the rotation of the hologram also causes a rotation of the spot on the detector about the laser diode. This is another means of moving the spots with respect to the detector.

In a second embodiment, hologram lens 74 of FIG. 1 is constructed so that it is similar to a lens 110 with a biprism 112 attached as shown in FIG. 6. The wavefront description of this lens is given by $$\phi(x,y) = \pi 2(ay + b\ x) + \pi(x^2 + y^2)/F_h$$

where $F_f$ is the focal length of the hologram lens so that the returned laser beam can focus on the detector surface 114. The relationship for determining $F_h$, using the parameters described in FIG. 4, is as follows:

$$1/F + 1/F_h = 1/(F-D).$$

This hologram lens produces two focused spots 116 and 118 on the detector as shown in FIG. 7. Similar to the first embodiment of FIG. 5, the two spots can be positioned precisely on dividing lines 120 and 122 of two pairs of parallel photodetectors 124 and 126 by translating the hologram lens along the y axis and rotating the hologram lens about the optical axis.

From this brief discussion we show that a holographic lens element can provide the adjustment needed in the alignment of the holographic laser optical head.

As will be understood by those familiar with the art, the present invention may be embodied in other specific forms without departing from the spirit or essential characteristics thereof. For example, the hologram lens could be constructed to be similar to a lens other than a toroidal lens. Accordingly, the disclosure of the preferred embodiments of the invention is intended to be illustrative, but not limiting, of the scope of the invention which is set forth in the following claims.

What is claimed is:

1. A method for aligning a photodetector and a diffraction grating, in an optical head which uses said diffraction grating to direct a light beam onto said photodetector, comprising the steps of:

mounting said photodetector in a housing for said optical head;

measuring a distance from a position for said diffraction grating to a surface of said mounted photodetector;

creating a grating pattern on said diffraction grating to produce, in cooperation with other elements of said optical head, one or more focused spots of diffracted beams at said distance; and mounted said diffraction grating in said optical head at said position.

2. The method of claim 1 wherein said grating pattern is created by holographic methods to simulate a toroidal lens having two foci.

3. The method of claim 2 wherein said two foci are at approximately equal distances in front of and behind said photodetector surface to produce a focal point at said photodetector surface.

4. The method of claim 1 further comprising the step of adjusting said grating pattern to adjust the x-y position where said beam hits said photodetector within a focus plane at said distance.

5. The method of claim 4 wherein said adjusting step comprises shifting said grating pattern linearly.

6. The method of claim 2 further comprising the step of adjusting said grating pattern to rotate said beam within a focus plane at said distance.

7. The method of claim 6 wherein said adjusting step comprises rotating said grating pattern about an optical axis of said optical head.

8. The method of claim 1 wherein said grating pattern is created by holographic methods to simulate a lens with a biprism attached.

9. The method of claim 8 further comprising the step of adjusting said grating pattern to rotate said beam within a focus plane at said distance.

10. The method of claim 8 wherein said adjusting step comprises rotating said grating pattern about an optical axis of said optical head.

* * * * *